United States Patent [19]
Curtiss et al.

[11] Patent Number: 4,693,290
[45] Date of Patent: Sep. 15, 1987

[54] BIAS PLY SNOW TIRE COMPATIBLE WITH RADIAL PLY TIRES

[75] Inventors: Walter W. Curtiss, Akron; John E. Lynch, Bedford, Ohio

[73] Assignee: The Goodyear & Rubber Company, Akron, Ohio

[21] Appl. No.: 472,907

[22] Filed: Mar. 7, 1983

Related U.S. Application Data

[63] Continuation of Ser. No. 960,276, Nov. 13, 1978, abandoned, which is a continuation of Ser. No. 773,365, Mar. 1, 1977, abandoned.

[51] Int. Cl.$^4$ ................................................ B60C 5/00
[52] U.S. Cl. ................................. 152/450; 152/454
[58] Field of Search ........... 152/330 R, 209 R, 354 R, 152/353 R, 450, 454

[56] References Cited

U.S. PATENT DOCUMENTS 3,623,527  11/1971  O'Neil et al. .................... 152/354 R
4,077,455   3/1978  Curtiss et al. .................... 152/354 R

FOREIGN PATENT DOCUMENTS 1438288  6/1976  United Kingdom ............ 152/354 R

Primary Examiner—Robert J. Spar
Assistant Examiner—Donald W. Underwood
Attorney, Agent, or Firm—L. R. Drayer

[57] ABSTRACT

A bias ply snow tire for use on the rear wheels of a passenger car having radial ply tires on the front wheels. The bias ply tire has a low aspect ratio, narrow tread with a shallow nonskid pattern, narrow flange spacing and high ply turn-ups. The point of maximum section width of the inflated bias ply tire is located in the radially inner one-half of the cross section of the tire.

10 Claims, 7 Drawing Figures

BIAS PLY SNOW TIRE COMPATIBLE WITH RADIAL PLY TIRES

This is a continuation of application Ser. No. 960,276 filed Nov. 13, 1978 which is a continuation of prior filed application Ser. No. 773,365 filed Mar. 1, 1977 abandoned.

This invention relates to pneumatic tires and more particularly to a bias ply snow tire which can safely be used in conjunction with radial ply tires.

Heretofore it has been the very strong recommendation of tire manufacturers and automobile manufacturers that bias ply tires should not be mixed with radial ply tires. Such a mixing of bias and radial ply tires had the result of decreasing the steering control of the vehicle. The worst condition that was believed to exist was that in which bias ply tires or bias belted tires were placed in the rear positions on the vehicle with radial ply tires being located on the front, steering wheels. Particularly, for example, see the following chart reporduced from "Tire Application Guide for Passenger Cars," published by the Rubber Manufacturer's Association, 1901 Pennsylvania Ave., N.W., Washington, D. C. 20006.

FIG. 7 is a sectional view of a modified form of the invention illustrating the carcass structure and belt structures.

Figure 1:
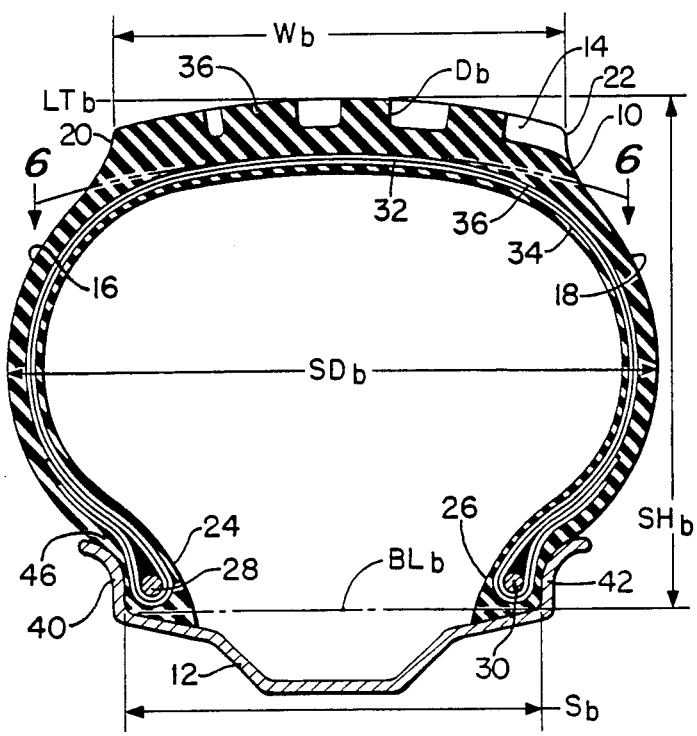

More particularly and with reference to the drawings, there is illustrated in FIG. 1 a bias ply tire 10 constructed in accordance with the present invention. The tire 10 is illustrated in its inflated condition and mounted on a rim 12. The tire 10 includes a circumferentially extending ground engaging tread portion 14, and a pair of sidewall portions 16,18 extending radially inwardly from the respective axially outer edges or shoulder portions 20,22 of the tread portion 14. The sidewall portions 16,18 terminate at their radially inner edges in a pair of bead portion 24,26 each having an annular inextensible bead core 28,30.

A cord reinforced carcass structure 32 extends cir-

| CONSTRUCTION→ | | BIAS on Front (Read down for rear) | | | | BELTED BIAS on Front (Read down for rear) | | | RADIAL on Front (Read down for rear) | | | |
|---|---|---|---|---|---|---|---|---|---|---|---|---|
| ↓ | Series (Profile)→ | Conv.* (83 Ser.) | 78 Ser. | 70 Ser. | 60/50 Ser. | 78 Ser. | 70 Ser. | 60/50 Ser. | Metric* | 78 Ser. | 70 Ser. | 60/50 Ser. |
| BIAS ON REAR (Read across for front) | Conv.* (83 Ser.) | Pref. | Acc. | NO | NO | Acc. | NO | NO | NO | NO | NO | NO |
| | 78 Ser. | Acc. | Pref. | Acc. | NO | Acc. | NO | NO | NO | NO | NO | NO |
| | 70 Ser. | Acc. | Acc. | Pref. | NO | Acc. | Acc. | NO | NO | NO | NO | NO |
| | 60/50 Ser. | Acc. | Acc. | Acc. | Pref. | Acc. | Acc. | Acc. | NO | NO | NO | NO |
| BELTED BIAS ON REAR (Read across for front) | 78 Ser. | Acc. | Acc. | Acc. | NO | Pref. | Acc. | NO | NO | NO | NO | NO |
| | 70 Ser. | Acc. | Acc. | Acc. | NO | Acc. | Pref. | NO | NO | NO | NO | NO |
| | 60/50 Ser. | Acc. | Acc. | Acc. | Acc. | Acc. | Acc. | Pref. | NO | NO | NO | NO |
| RADIAL ON REAR (Read across for front) | Metric* | Acc. | Acc. | Acc. | NO | Acc. | Acc. | NO | Pref. | Acc. | Acc. | NO |
| | 78 Ser. | Acc. | Acc. | Acc. | NO | Acc. | Acc. | NO | Acc. | Pref. | Acc. | NO |
| | 70 Ser. | Acc. | Acc. | Acc. | NO | Acc. | Acc. | NO | Acc. | Acc. | Pref. | NO |
| | 60/50 Ser. | Acc. | Acc. | Acc. | Acc. | Acc. | Acc. | Acc. | Acc. | Acc. | Acc. | Pref. |

*Conv. = Conventional Ser. = Series
Acc. = Acceptable - Acceptable but not preferred applications. Consult your car owner's manual and do not apply if vehicle manufacturer recommends against this application.
Pref. = Preferred - Preferred application. For best all-around car handling performance, tires of the same size and construction should be used on all wheel positions.
NO = Not recommended Applicants have quite surprisingly discovered that by providing a specific combination of certain structural features, a bias ply tire can be utilized in the rear wheel positions on a passenger car having radial ply tires in the front wheel positions without excessive loss in steering control or maneuverability. In accordance with the present invention a bias ply rear tire which is compatible with radial ply front tires is provided. Specifically, the bias ply tire has a low aspect ratio as compared to the radial ply tires, a narrow nonskid portion with a shallow tread pattern, narrow rim flange spacing, high ply turn-ups and a maximum section width located in the radially inner one-half of the cross section of the tire.

Other objects will be in part apparent and in part pointed out more in detail hereinafter.

Figure 2:
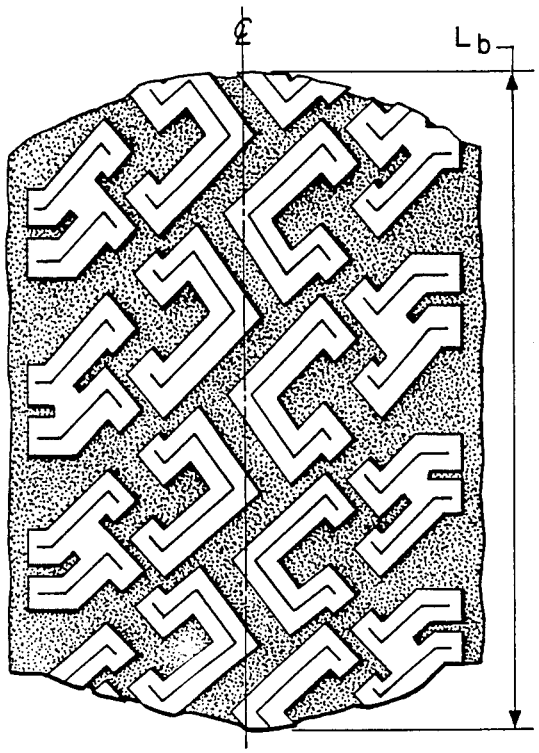

In the drawings:

FIG. 1 is a cross sectional view of a bias ply tire construction used in accordance with the present invention;

FIG. 2 is a plan view of the footprint of the tire of FIG. 1;

cumferentially about the tire and from bead portion 24 to bead portion 26. In the particular embodiment illustrated, the carcass structure includes two plies 34,36 of continuous tire cord fabric of any suitable material.

The ground engaging tread portion includes a nonskid pattern 36 having a depth $D_b$. In this specification the subscript b shall designate dimensions of the bias ply tire while the subscript r shall designate dimensions of the radial ply tire. Also, for purposes of this specification, the depth of the nonskid portion shall be measured when the tire is new and is the maximum depth measured perpendicularly from a tangent to the tread surface to the maximum depth of the recesses in the tread pattern in the axially central one-third of the nonskid tread surface. The nonskid tread surface is that portion of the tread surface which engages the ground or tire supporting surface when the tire is inflated to design inflation pressure and loaded to the design load. The length $L_b$ of the footprint, illustrated in FIG. 2, is the maximum length of the footprint measured parallel to the circumferential center line of the tire. The width $W_b$ of the tire 10 is the maximum width of the tread portion 14 measured perpendicularly to the circumferential center line of the tire. For purposes of this invention and as understood by those skilled in the art, the aspect ratio of a tire is the ratio of the section height of the tire to the section width of the tire measured when the tire is inflated to design inflation pressure.

As noted above, the tire 10 is illustrated in its mounted and inflated condition. For purposes of this invention a tire shall be considered inflated if it is inflated to within the normal design inflation pressure. The maximum section width $SD_b$ of the tire is the maximum axial distance between the outside surfaces of the tire sidewalls exclusive of lettering or adornment and measured when the tire is mounted on a rim and inflated to design inflation pressure. The maximum section height $SH_b$ is the radial distance between bead base line $BL_b$, a line tangent to the innermost portions of the bead heel sharp point, and tread tangent line $TL_b$, a line tangent to the radially outermost point on the ground engaging treat portion measured when the tire is inflated to design inflation pressure. The axial flange spacing $S_b$ is the axial distance between the bead engaging surfaces of the radially extending flanges 40 and 42 of the rim 12.

Figure 3:
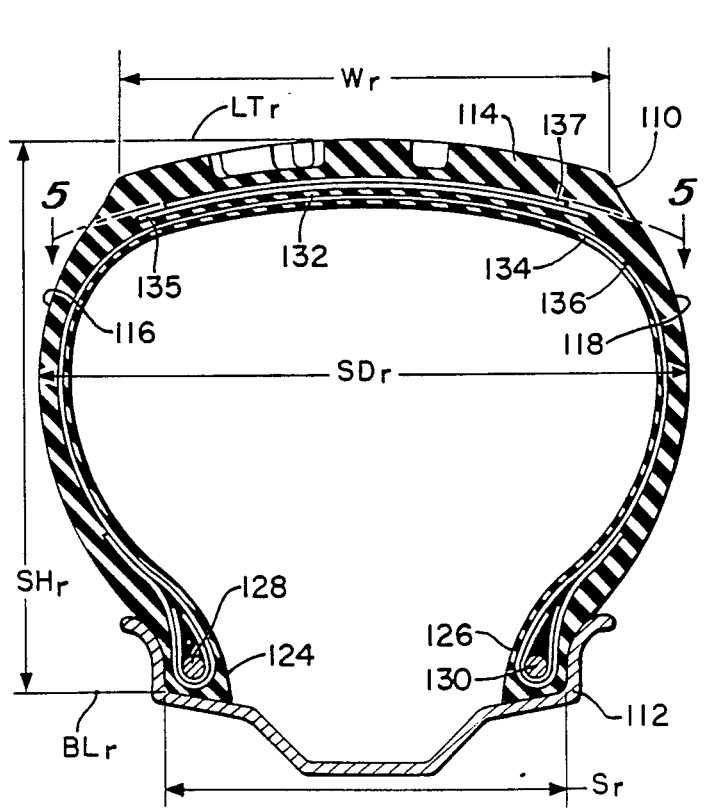
FIG. 3 is a cross sectional view of a radial ply tire used in conjunction with the tire of FIG. 1.
Figure 4:
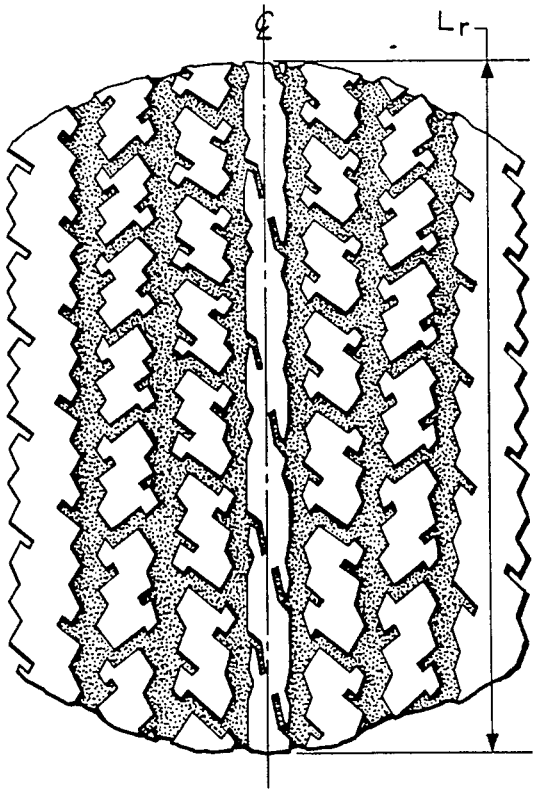
FIG. 4 is a plan view of a footprint of the tire of FIG. 3.

The radial tire 110 illustrated in FIG. 3 has dimensions designated in the same manner as those of the bias ply tire but, as noted above, are designated by the subscript r. Thus, the radial ply tire 110 has a tread width $W_r$, tread length $L_r$, flange spacing $S_r$, maximum section width $SD_r$, bead base line $BL_r$ and section height $SH_r$. The radial ply tire 110 is illustrated in an inflated condition and mounted on a rim 112 and includes a ground engaging tread portion 114, a pair of sidewall portions 116, 118 and a pair of bead portions 124,126 each having an annular inextensible bead core 128,130. The carcass structure 132 includes a pair of radial carcass plies 134,136 and a pair of belt plies 135,137 extending circumferentially about the carcass plies and disposed beneath the tread portion 114.

For purposes of this invention a radial ply tire shall be considered a tire having its carcass plies extending from each bead core to the tread portion with the cords in the carcass plies extending at an angle of no greater than 10 degrees with respect to planes containing the rotational axis of the tire over at least 50 percent of the section height of the tire.

Figure 5:
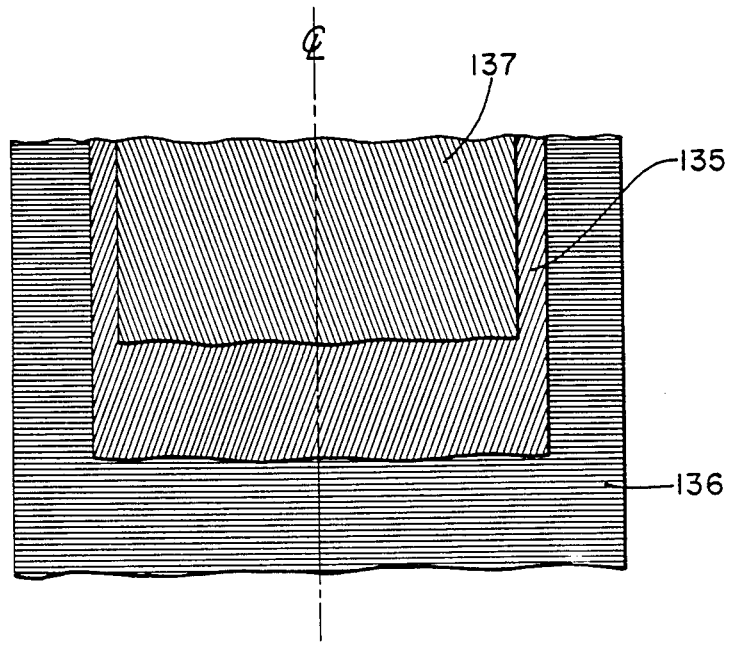
FIG. 5 is a sectional view taken along lines 5—5 of FIG. 3 illustrating the carcass structure of the tire of FIG. 3.

More particularly, the specific radial tire 110 illustrated is a size HR 78-15 and has an aspect ratio of 0.76 measured at 24 psi. The point of maximum section width $SD_r$ is located in the radial outer one-half of the tire cross section. The flange spacing $S_r$ of the rim 112 is 6.0 inches. The maximum section width is 8.55 inches and the maximum section height is 6.52 inches. The tire 110 has a footprint length $L_r$ equal to 10.18 inches and a width $W_r$ equal to 6.07 inches. With reference to FIG. 5, the carcass plies 134,136 are polyester and have a cord angle of 90 degrees. The belt plies 135,137 are steel and have a cord angle of 23 degrees.

Figure 6:
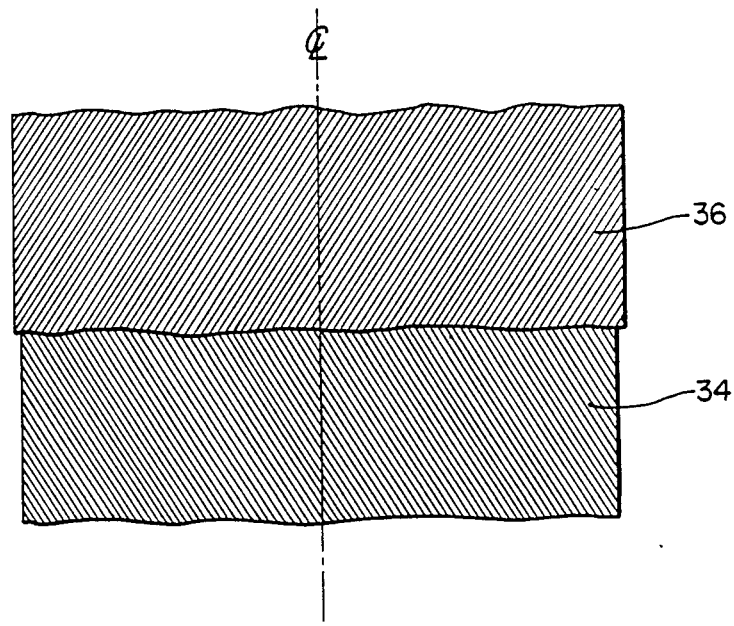
FIG. 6 is a sectional view taken along line 6—6 of FIG. 1 illustrating the carcass structure of the tire of FIG. 1.

The specific bias ply tire 10 illustrated is a size H65-15. The section height $SH_b$ us 6.60 inches, the section width $SD_b$ is 9.60 inches and the aspect ratio is 0.69. The tire 10 has a maximum footprint length $L_b$ equal to 9.63 inches and a width $W_b$ equal to 6.80 inches. The tread depth $D_b$ is 0.455 inch and the flange spacing $S_b$ is 6.0 inches. The point of maximum section width $SD_b$ is located in the radially inner one-half of the tire corss section. More specifically and with reference to FIG. 6, the cords in carcass plies 34,36 extend at an angle of 30 degrees with respect to the circumferential center line of the tite and the cords extend at successively alternate angles with respect to the center line.

It can be seen, therefore, that the tread width $W_b$ of the bias ply tire is equl to 71 percent of the maximum section width $SD_b$ of the tire 10 but is greater than the axial spacing of the rim flange. Preferably the width $W_b$ of the ground engaging tread surface is equal to between 50 and 80 percent of the maximum section width $SD_b$. The flange spacing $S_b$ on the bias ply tire 10 is equal to 62.5 percent of the maximum section width $SD_b$ and equal to the flange spacing $S_r$ of tire 110. Preferably the flange spacing $S_b$, is less than 65 percent of the maximum section width $SD_b$ and is no greater than the actual flange spacing $S_r$.

Further, as noted above, the aspect ratio of the bias ply tire is 0.69 as compared to 0.76 for the radial ply tire. It can be seen that this aspect ratio is significantly less than that of the radial ply tire 110. The aspect ratio of the radial ply tire 10 should be equal to between 5 percent and 30 percent greater than the aspect ratio of the bias ply tire.

The radially inner ends of the carcass plies 34,36 of the bias ply tire 10 extends radially outwardly of and from the bead cores 28,30 to a point between 25 and 55 percent of the distance $SH_b$ between the bead base line $BL_b$ and the tread tangent line $TL_b$ of the tire 10. Although the specific angle of the cords of the bias ply tire with respect to the center line was disclosed as 30 degrees, this angle should be maintained at a relatively low value, preferably between 20 and 35 degrees.

The ratio of the surface contacting portion of the footprint area to the open spaces of the footprint area of the bias ply tire 10 illustrated is equal 1.3. Preferably this ratio is less than 2.0 and in any event is less than that of the radial ply tire. The depth of the nonskid portion 14 of the bias ply tire 10 should be no more than 35 percent greater than the depth of the nonskid portion of the radial ply tire 110. All footprint data was measured at 24 psi and 1510 pounds of load.

In a specific test of the present invention two radial ply tires of the type illustrated in FIG. 3 were mounted on the rear portion of a vehicle, the front portion of the vehicle having two conventional radial passenger tires mounted thereon, and were evaluated for maximum handling. Subsequently various pairs of bias ply tires were mounted on the rear portion of the vehicle and were also tested. The results of this test are shown on the following chart.

| | Comments | Response Quickness | Response Smoothness | Gain | Evasive Maneuver | Passing Maneuver |
|---|---|---|---|---|---|---|
| | H60-15 RADIAL COMPATIBLE WINTER TIRE Max Handling Evaluation | | | | | |
| Row 1 | Excellent, crisp, comfortable, complete control | 10 | 10 | 10 | 9 | 10 |
| Row 2 | Unacceptable, | 8 | 6 | 6 | 4 | 6 |

-continued

H60-15 RADIAL COMPATIBLE WINTER TIRE
Max Handling Evaluation

|  | Comments | Response Quickness | Response Smoothness | Gain | Evasive Maneuver | Passing Maneuver |
|---|---|---|---|---|---|---|
|  | fronts too quick for rears, too much oscillation on evasive |  |  |  |  |  |
| Row 3 | Excellent, crisp, comfortable, complete control | 9 | 9 | 10 | 9 | 10 |
| Row 4 | Excellent, crisp, comfortable, complete control | 9 | 9 | 10 | 9 | 9 |
| Row 5 | Acceptable, too much rear slide | 8 | 8 | 9 | 8 | 8 |

All tires run with HR78-15 CPS radial front tires.

A rating of 10 was the highest possible rating a tire could receive and was considered excellent. A rating of 6 or less was considered as being unacceptable.

The results listed in row 1 are for a radial winter tire having features of the tire illustrated in FIG. 3. Row 2 results are for a conventional winter tire having two carcass plies and two circumferential reinforcing belts. Results listed in row 3 are for a winter tire as illustrated and described in FIG. 1. The results listed in row 4 are for a winter tire also embodying features of the present invention except that two circumferential reinforcing belts disposed about the carcass and beneath the tread portion were added. Test results listed in row 5 are for a winter tire similar to the winter tire illustrated in FIG. 1 except that in this case two additional carcass plies were added. Results obtained on the winter tires embodying features of the present invention were clearly far superior to that of the conventional winter tires listed in row 2. More specifically, the results listed in row 3 for the tire illustrated and described in FIG. 1 showed a marked improvement over conventional bias belted winter tires of row 2 while still maintaining performance characteristics nearly equal to the conventional radial winter tires of row 1.

Although best results were obtained utilizing a two-ply bias tire having no belt plies, the test showed that very similar results could be obtained with bias belted tires having other structural features as described in the above test. Therefore, while the most marked improvement was obtained with respect to bias ply tires having no belt structure, it will be appreciated that in some instances it may be desirable to provide such a belt structure.

While certain representative embodiments and details have been shown for the purpose of illustrating the invention, it will be apparent to those skilled in this art that various changes and modifications may be made therein without departing from the spirit or scope of the invention.

We claim:

1. In combination, a passsenger vehicle, a pair of radial ply tires in the front wheel positions of said vehicle, a pair of bias ply tires in the rear wheel positions of said vehicle, each of said radial ply tires having an aspect ratio of between 50 and 83, each of said bias ply tires having a circumferentially extending ground engaging tread portion, a pair of sidewall portions, and a pair of bead portions each having an annular inextensible bead core; characterized by each of said bias ply tires comprising a plurality of carcass plies extending circumferentially about the tire and from bead portion to bead portion with the axially outer ends of said carcass plies being turned axially outwardly about the respective bead core and extending radially outwardly therefrom and terminating in the respective sidewall at a distance from the bead base line equal to between 15 and 40 percent of the maximum section height of the tire, the cords of said carcass plies of said bias ply tires form an angle with respect to the mid-circumferential center line of said bias ply tires of between 20 and 35 degrees, an aspect ratio which is at least 5 percent less than the aspect ratio of said radial ply tires, each of said bias ply tires having a non-skid treat pattern, the depth of the non-skid portion of said bias tires is no more than 35 percent greater than the depth of the non-skid portion of said radial tires, the width of the ground-engaging tread portion of each of said bias ply tires is equal to between 50 percent and 80 percent of the maximum section width of said bias ply tires, the point of maximum section width of each of said bias ply tires is located within the radially inner one-half of the cross-section of the tire and each of said radial ply tires in the front wheel positions of the car have a point of maximum section width located in the radially outer one-half of the cross-section of said radial ply tire.

2. The combination according to claim 1 further characterized by each of said bias ply tires being mounted on a rim having axial flange spacing equal to less than 65 percent of the maximum section width of said bias ply tire.

3. The combination according to claim 1 further characterized by each of said bis ply tires being mounted on a rim having an axial flange spacing which is no greater than the axial flange spacing of the rim on which each of said radial ply tires are mounted.

4. The combination according to claim 1 further characterized in that said plurality of carcass plies of each of said bias ply tires is two.

5. The combination according to claim 4 further characterized by each of said bias ply tires having two circumferential reinforcing belts disposed between said tread portion and said carcass plies.

6. In combination, a passenger vehicle, a pair of radial ply tires in the front wheel positions of said vehicle, a pair of bias ply tires in the rear wheel positions of said vehicle, each of said radial ply tires having an aspect ratio of between 50 and 83, each of said bias ply tires having a circumferentially extending ground engaging tread portion, a pair of sidewall portions, and a pair of bead portions each having an annular inextensible bead core; characterized by each of said bias ply tires comprising a plurality of carcass plies extending circumferentially about the tire and from bead portion to bead portion with the axially outer ends of said carcass plies being turned axially outwardly about the respective bead core and extending radially outwardly therefrom and terminating in the respective sidewall at a distance from the bead base line equal to between 15 and 40 percent of the maximum section height of the tire, the cords of said carcass plies of said bias ply tires form an angle with respect to the mid-circumferential center line of said bias ply tires of between 20 and 35 degrees, a plurality of circumferentially reinforcing belts disposed between said carcass plies and said tread portion, an aspect ratio which is at least 5 percent less than the aspect ratio of said radial ply tires, each of said bias ply tires having a non-skid tread pattern, the depth of the non-skid portion of said bias ply tires is no more than 35 percent greater than the depth of the non-skid portion of said radial tire, the width of the ground engaging tread portion of each of said bias ply tires is equal to between 50 percent and 80 percent of the maximum section width of said bias ply tires, the point of maximum section width of each of said bias ply tires is located within the radially inner one-half of the cross-section of the tire and each of said radial ply tires in the front wheel positions of the car have a point of maximum section width located in the radially outer one-half of the cross-section of said radial ply tire.

7. The combination according to claim 6 further characterized in that said plurality of carcass plies of each of said bias ply tires is two.

8. The combination according to claim 6 further characterized by each of said bias ply tires being mounted on a rim having an axial flange spacing equal to less than 65 percent of the maximum section width of said bias ply tire.

9. The combination according to claim 6 further characterized by each of said bias ply tires being mounted on a rim having an axial flange spacing which is no greater than the axial flange spacing of the rim on which said radial ply tires are mounted.

10. The combination according to claim 6 further characterized in that said plurality of carcass plies of each of said bias ply tires is two.

* * * * *